Figure 1:
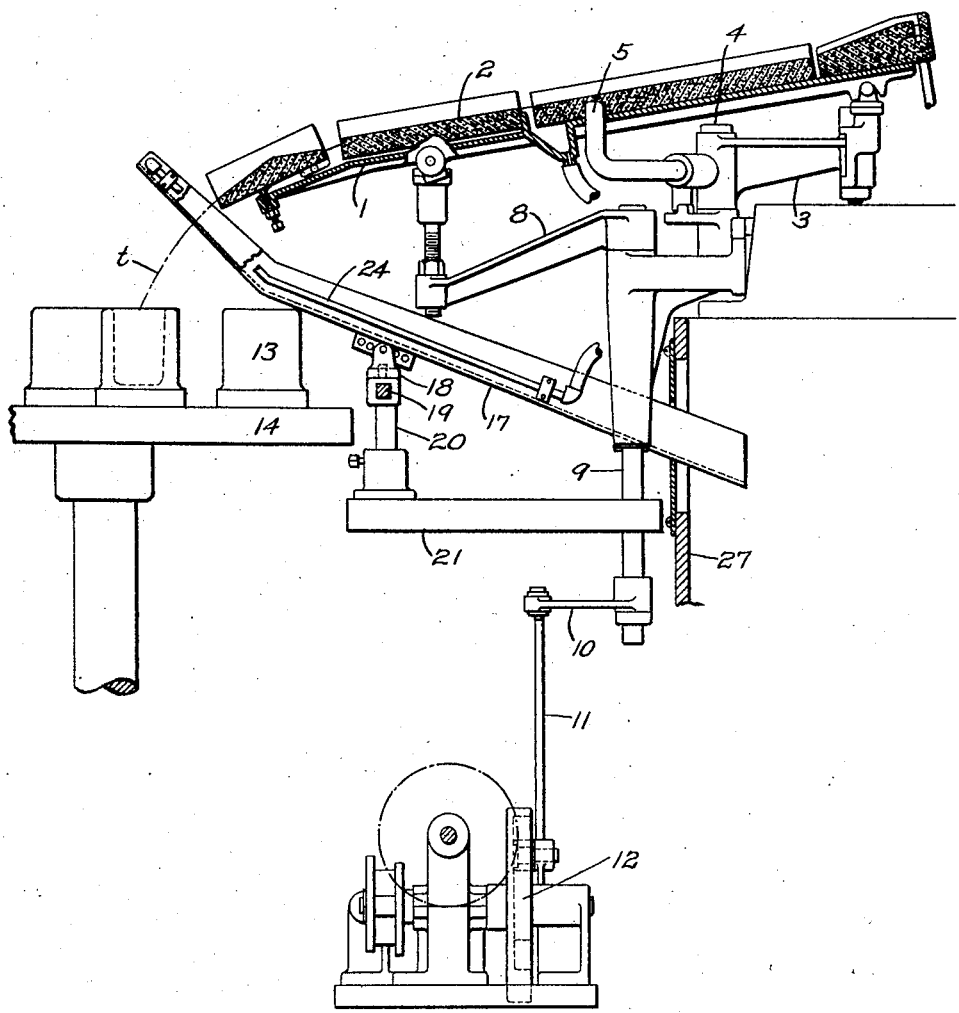

A. R. HUNTER.
GLASS WORKING MACHINE.
APPLICATION FILED NOV. 12, 1917.

1,353,115.

Patented Sept. 14, 1920.
3 SHEETS—SHEET 1.

Witness
E. L. Jarvis

Inventor
Alfred R. Hunter
by W. H. Honiss Att'y

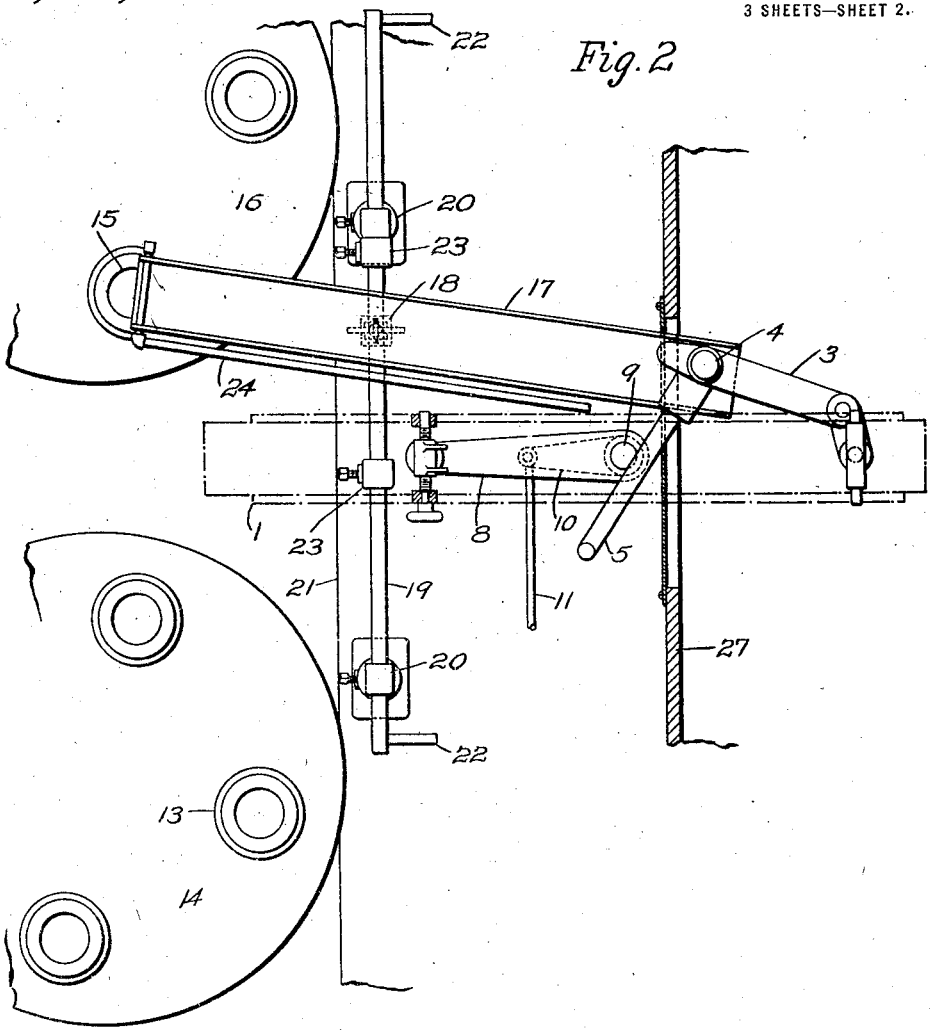

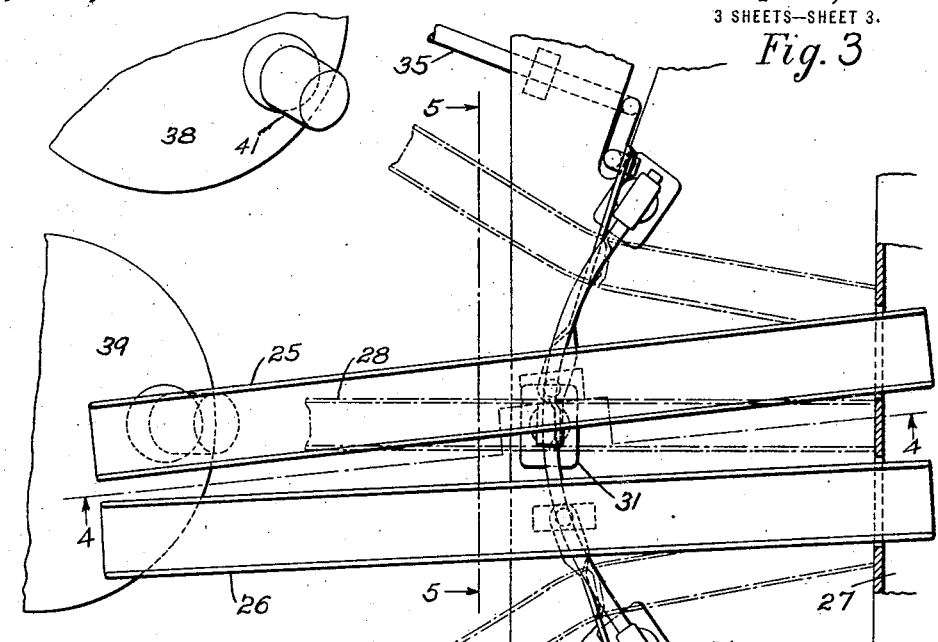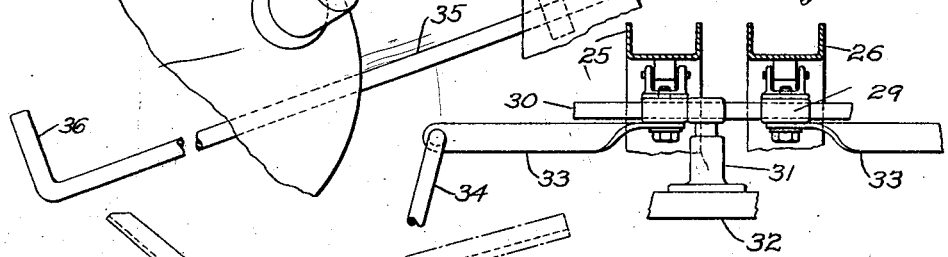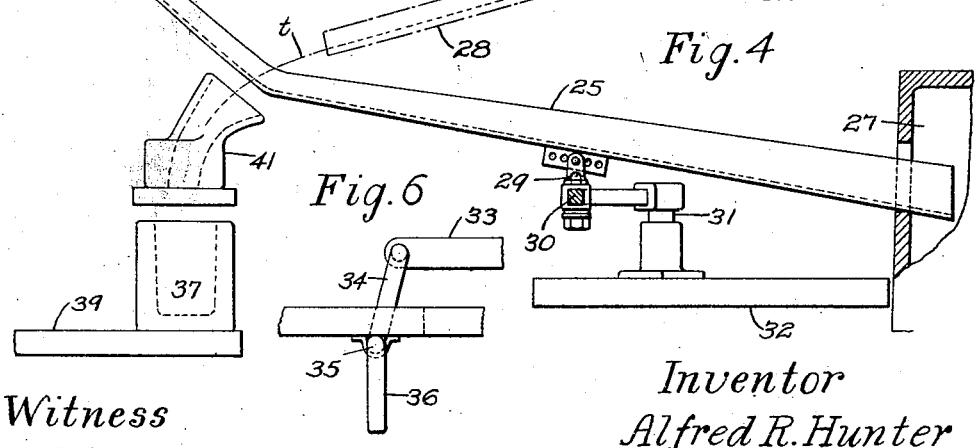

UNITED STATES PATENT OFFICE.

ALFRED R. HUNTER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-WORKING MACHINE.

1,353,115.        Specification of Letters Patent.        Patented Sept. 14, 1920.

Application filed November 12, 1917. Serial No. 201,469.

*To all whom it may concern:*

Be it known that I, ALFRED R. HUNTER, a citizen of the United States, residing at Hartford, in the county of Hartford and State of Connecticut, have invented new and useful Improvements in Glass-Working Machines, of which the following is a specification.

In the manufacture of glassware, the charges of molten glass, usually in the form of separated gathers, are sometimes fed or delivered from a single melting furnace or other source of supply to the molds of two or more shaping machines. For this purpose, one or more delivery troughs or conveyers are arranged to deliver the glass from the source of supply to the molds of the different machines, while the latter are at their receiving or charging stations. As is well understood in the glass working art, it is desirable to maintain substantial uniformity of outflow of the molten glass from the furnace, whether fed constantly or intermittently, so as to preserve uniform heat conditions. It is sometimes necessary, however, to stop one of the shaping machines, for adjustment of its molds, or for other reasons. In such cases it is desirable to continue the operation of the associated shaping machines, to avoid the loss of its production, and, for the reasons above given, it is also desirable to continue the full and uniform feed or flow of the molten glass from the furnace.

The present invention is an apparatus for intercepting the charges of glass which would otherwise be delivered to the stopped machine or machines, deflecting them from their normal course into a cullet pit or other receptacle, without interfering with the delivery of the charges intended for the companion machine or machines which are not stopped, thus enabling the other machine or machines to be continued in operation.

This invention is herein shown in conjunction with a trough delivering apparatus which forms no part of the present invention, but is shown herein to illustrate the relation and the coöperation of the present invention therewith.

Figure 1 of the accompanying drawings shows a side elevation, with the delivery trough conveyer or chute in section, of an apparatus for feeding charges of molten glass to pressing or blowing molds and for deflecting the charges according to this invention from the molds of the stopped machine. Fig. 2 is a plan view of the apparatus illustrated in Fig. 1, arranged for use in connection with the molds of two forming machines, the delivery trough in this view being indicaed by dot-and-dash outline. Fig. 3 is a plan view of an apparatus which embodies this invention designed for use in connection with the molds of three glass forming machines. Fig. 4 is a side view of a deflector chute and its supporting means looking from the line 4—4 on Fig. 3. Fig. 5 is an end elevation of the deflecting chute in section taken on the line 5—5 of Fig. 3. Fig. 6 is a detail view showing one of the chute moving handles and connections.

The charges of glass are normally conveyed and delivered to the machines by means of a delivering trough 1, which extends from beneath the outlet of the furnace or other glass container 7 toward the charging position or positions of the molds, far enough to insure delivery thereto. The troughs herein shown are inclined sufficiently to allow the charges to slide along them by gravity, and to acquire a momentum which will carry them across the interval between the ends of the troughs into the respective molds in a path or trajectory indicated by the line $t$ in Figs. 1 and 4. The troughs are, or may be, provided with suitable heat resisting linings 2, the surfaces of which may be lubricated with a stream or film of water. Near its upper end the trough is swiveled upon the end of a swinging arm 3, which is pivotally mounted on a stud 4, and is provided with a handle 5 by means of which it may be turned so as to move the upper end of the trough into and out of position for receiving the gathers 6 as they are detached from the molten glass container 7 or other source of supply. The lower end of the delivery trough is swiveled upon the end of an oscillatory arm 8, attached to a shaft 9 which through the arm 10 and link 11 is oscillated by a cam 12 of any convenient driving mechanism which may also drive, or be connected with the associated shaping machines to which the charges are being delivered. The cam serves to swing the lower end of the trough regularly back and forth from the molds 13 on the rotatable table 14 of one shaping machine to the molds 15 on the rotatable table 16 of another shaping machine, as these molds are successively brought into receiving or "charging" position.

The charge delivering apparatus thus far described forms no part of the present invention, which relates to the intercepting and deflecting of the charges thus delivered, and will now be described.

The inclined deflector chute 17 is mounted on a block 18 which is attached to a shipper rod 19 that is movably supported by standards 20 on the bed 21. At each end of the shipper rod is a handle 22, and on the rod are adjustably fixed the stop blocks 23, which by engagement with the standards limit the movement of the shipper rod and chute to the required range. The lower end of the deflector chute extends into or over the cullet pit 27 or other receptacle, and its upper end extends to and is capable of being selectively moved into and out of any convenient portion of the path of travel of the charges. The upper, intercepting end of the chute is herein shown to extend across the path of the charges, beyond the delivering end of the trough 1, into the gap or interval between that end and the molds, thus intercepting the charges in the air.

When both of the shaping machines are running normally and the trough 1 is oscillating from one to the other for feeding the charges first to a mold on one machine and then to a mold on the other machine, the upper end of the deflector chute rests idly between the tables of the two machines, and consequently does not interfere with the normal feeding of the charges to either machine. If for any reason one of the machines is to be stopped and it is desired to keep the other machine in operation, the shipper rod is moved so as to carry the upper end of the deflector chute over the gather receiving or charging position of the molds of the machine that is to be stopped. With the chute in this position the charges that are fed down the delivery trough, and that normally would go into the molds of that machine, will be intercepted and diverted by the chute, and conducted down into the cullet pit. To assist the sliding of the molten glass gathers down the deflector chute a water pipe 24 having a jointed or flexible connection may be attached to the chute in such manner as to carry a regulated supply of water to the upper end of the chute, whence it flows along the chute into the cullet pit.

Where the glass is being delivered to the molds of three machines, as shown in Fig. 3, two inclined deflector chutes 25 and 26 may be provided. In this case the chutes, with their lower ends extending into the cullet pit 27, and their upper ends extending so that they can be moved in front of the ends of the delivery troughs 28, are mounted on blocks 29 that are slidable on a bar 30 which is supported by standards 31 on the bed 32. Each of these chute blocks is connected by a link 33 to the upper end of a rocker arm 34 attached to a rod 35 provided with a handle 36. The blocks 29 abut against the ends of the supports 31, at their respective intercepting positions, thus registering the chutes at those positions, as selected.

In the arrangement illustrated in Figs. 3 and 4 above the molds 37 on the tables 38, 39 and 40, are curved funnels 41 designed to conduct the gathers of glass that slide down the delivery troughs into the molds, and in this case the upper ends of the deflecting chutes 25 and 26 swing between these funnels and the ends of the delivery troughs 28.

When it is desired or becomes necessary to stop the table 39 of the middle machine, either of the deflecting chutes may be employed as an intercepter. In Fig. 3 the chute 25 is thus employed, the chute 26 remaining idle. When the troughs are located in this manner the glass will feed as usual to the molds on the tables of the two outer machines, but the charges which normally would pass to the molds of the middle machine will be intercepted by the chute 25 and deflected to the cullet pit. If two of the machines are stopped and it is desired to continue the operation of the other, the respective deflecting chutes are moved so as to intercept the flow of glass from the machines to be stopped. When all of the machines are operated normally, the chutes may be swung so that their upper ends rest idly between the machines, where they will not interfere with the delivery of the glass to any machine.

The invention claimed is:

1. The combination with means for delivering mold charges of molten glass successively to a plurality of mold charging stations, of means adapted to be selectively interposed between either of said stations and delivery means for deflecting the glass from its normal path of delivery to the said station while permitting delivery of the glass to the other of said stations.

2. The combination with apparatus for delivering molten glass, including a movable delivery trough for delivering the glass to different locations, of a deflector chute mounted for movement into and out of intercepting relation to different delivering positions of the delivery trough.

3. The combination with apparatus for delivering molten glass, including a delivery trough movable to different delivery positions, of a deflector chute mounted for movement into and out of intercepting relation to the delivery trough at any of its said delivering positions.

4. The combination with apparatus for delivering charges of molten glass, including an inclined delivery trough movable to different glass delivering positions, of an inclined deflector chute also movable to intercept the glass delivered at the said different positions, and means for registering the said chute in its intercepting positions.

5. The combination with apparatus for delivering charges of molten glass, including an inclined delivery trough movable to different glass delivering positions, of a reversely inclined deflector chute selectively movable to intercept the glass delivered at the said different positions, and means for registering the said chute in its intercepting positions.

6. The combination with apparatus for delivering charges of molten glass, including an inclined delivery trough movable to different glass delivering positions, of a swinging inclined deflector chute arranged to swing its upper end in and out of intercepting relation to the lower end of the inclined delivery trough at its different glass delivering positions.

7. The combination with apparatus for delivering charges of glass, including an inclined delivery trough pivotally mounted near its upper end and movable to different glass delivering positions, of a reversely inclined deflector chute pivotally mounted near its lower end to swing its upper end into intercepting relation to the lower end of the delivery trough at different delivery positions of that trough.

8. The combination with apparatus for delivering molten glass to a plurality of molds at different locations, including a movable delivery trough extending toward the molds, and shiftable from one of said locations to the other, of a movable deflector chute extending between the path of the delivery end of the trough and the molds and movable from in front of any of the delivery positions of the trough, to intercept the glass delivered at any selected location.

9. The combination with apparatus for delivering molten glass, including a movable delivery trough for delivering the glass at different locations, of a movable deflector chute, means for moving the deflector chute into and out of intercepting relation with different delivering positions of the delivering trough, and means connected with the moving end of the deflector chute for wetting its glass conveying surface.

10. The combination with apparatus for delivering mold charges of molten glass including a movable delivery trough adapted to deliver the glass from a glass feeding station to a plurality of mold charging stations in succession, of deflecting means adapted to be selectively interposed between said delivery trough and any of said stations, to deflect mold charges from their normal path of delivery to said station while permitting the normal delivery of mold charges to any other station.

Signed at Hartford, Connecticut, this 9th day of November, 1917.

ALFRED R. HUNTER.